(12) United States Patent
Benner et al.

(10) Patent No.: US 7,128,472 B2
(45) Date of Patent: Oct. 31, 2006

(54) METHOD AND APPARATUS FOR PROVIDING OPTOELECTRONIC COMMUNICATION WITH AN ELECTRONIC DEVICE

(75) Inventors: Alan F. Benner, Poughkeepsie, NY (US); Evan G. Colgan, Chestnut Ridge, NY (US); How Tzu Lin, Vestal, NY (US); John H. Magerlein, Yorktown Heights, NY (US); Frank L. Pompeo, Redding, CT (US); Subhash L. Shinde, Cortlandt Manor, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 10/631,933

(22) Filed: Jul. 31, 2003

(65) Prior Publication Data

US 2005/0025434 A1    Feb. 3, 2005

(51) Int. Cl.
   *G02B 6/42* (2006.01)
   *G02B 6/36* (2006.01)
   *G02B 6/43* (2006.01)
(52) U.S. Cl. .......................................... 385/88; 385/89
(58) Field of Classification Search .................. 385/88, 385/89
   See application file for complete search history.

(56) References Cited

U.S. PATENT DOCUMENTS

| | | | | |
|---|---|---|---|---|
| 5,371,820 A | | 12/1994 | Welbourn et al. .............. 385/76 |
| 5,539,848 A | * | 7/1996 | Galloway ....................... 385/89 |
| 5,600,130 A | | 2/1997 | VanZeghbroeck ......... 250/214.1 |
| 5,625,734 A | * | 4/1997 | Thomas et al. ................. 385/88 |
| 5,768,456 A | | 6/1998 | Knapp et al. ................... 385/49 |
| 5,774,614 A | | 6/1998 | Gilliland et al. ............... 385/88 |
| 6,234,687 B1 | | 5/2001 | Hall et al. ....................... 385/88 |
| 6,236,671 B1 | | 5/2001 | Babic ........................... 372/50 |
| 6,270,262 B1 | * | 8/2001 | Hudgins et al. ............... 385/88 |
| 6,306,511 B1 | * | 10/2001 | Nakao et al. ................. 428/426 |
| 6,318,909 B1 | * | 11/2001 | Giboney et al. ............... 385/90 |
| 6,454,469 B1 | | 9/2002 | Hall et al. ...................... 385/90 |
| 6,659,656 B1 | * | 12/2003 | Brezina et al. ................ 385/92 |
| 6,767,142 B1 | * | 7/2004 | Stricot et al. .................. 385/92 |
| 2001/0026388 A1 | | 10/2001 | Zanten et al. ................. 359/163 |
| 2001/0050430 A1 | | 12/2001 | Vendier et al ............... 257/717 |
| 2002/0115342 A1 | | 8/2002 | Stricot et al. ................ 439/577 |
| 2002/0122636 A1 | | 9/2002 | Anderson et al. ............. 385/89 |

(Continued)

OTHER PUBLICATIONS

IBM Technical Disclosure, vol. 36, No. Dec. 12, 1993, p. 39.

*Primary Examiner*—Sung Pak
(74) *Attorney, Agent, or Firm*—Cantor Colburn LLP

(57) ABSTRACT

An optoelectronic assembly for a computer system includes an electronic chip(s), a substrate, an electrical signaling medium, an optoelectronic transducer, and an optical coupling guide. The electronic chip(s) is in communication with the substrate, which is in communication with a first end of the electrical signaling medium. A second end of the electrical signaling medium is in communication with the optoelectronic transducer, and includes the optical coupling guide for aligning an optical signaling medium with the optoelectronic transducer. An electrical signal from the electronic chip is communicated to the optoelectronic transducer via the substrate and the electrical signaling medium. The optical transducer and electronic chip(s) share a common heat spreader, and communication to other groups of electronic chip(s) is done without the need for communication via a second level electrical package.

15 Claims, 3 Drawing Sheets

U.S. PATENT DOCUMENTS

2002/0126951 A1    9/2002    Sutherland et al. ........... 385/24
2002/0131730 A1    9/2002    Keeble et al. ................ 385/92
2002/0154869 A1    10/2002   Chan et al. ................... 385/88

* cited by examiner

METHOD AND APPARATUS FOR PROVIDING OPTOELECTRONIC COMMUNICATION WITH AN ELECTRONIC DEVICE

BACKGROUND OF THE INVENTION

The present disclosure relates generally to optoelectronic communication with an electronic device, and particularly to the attachment arrangement for providing optoelectronic communication between an electronic chip on a first level package and a high density optical transceiver.

Typically, optoelectronic transceivers are mounted on a second level package, such as a printed circuit board, and are provided with their own heat sink and a means of being electrically interconnected with a printed circuit board, such as via a socket or a solder Ball Grid Array (BGA). The typical pitch of the electrical connections in a BGA is approximately 1.27 mm, although some products use finer pitches such as 1.0 or 0.8 mm. The size of an optoelectronic transceiver is largely determined by the area required by the heat sink and/or the area required for electrical connections between the optoelectronic transceiver and the second level package.

The trend in the computer industry regarding large servers is to utilize multiple processor groups, each group containing multiple processors on a first level package, such as a Multi-Chip Module (MCM), which must be interconnected with very high speed data buses to enable the totality of processors to act in unison, otherwise referred to as a symmetric multi-processing (SMP) configuration. The first level package provides dense electrical interconnection between the multiple processor chip(s), each of which my contain multiple processor cores, cache memory chip(s) and other support chips, which may also be mounted on the MCM or other first level package. To connect between multiple MCMs, copper interconnect technology has been used as the interconnect medium, but is limited in its ability to scale to the bandwidth/distance requirements of next generation servers. These limitations are primarily associated with the signal loss and distortion in the electrical transport media, such as printed circuit boards and connectors for example, and bandwidth reduction due to the skin effect at high data transmission rates. To overcome some of these limitations, optical interconnection, which does not have the copper limitations and can operate at speeds sufficient to satisfy future generation server interconnection requirements, is becoming the interconnection technology of choice. Many of these same technical problems occur in data communication systems (for example, datacom and telephone switching networks) that may also benefit from optical interconnection technology. Accordingly, there is a need in the art to provide an improved apparatus and method for providing optoelectronic communication with electronic chips, and particularly with electronic chips on a first level package such as MCMs in large high speed servers or data communication systems.

SUMMARY OF THE INVENTION

In one embodiment, an optoelectronic assembly for a computer system or data communication system includes an electronic chip, an optoelectronic transducer, a substrate having electrical signal connections with the electronic chip, an electrical signaling medium having a first end in electrical communication with the substrate, an optoelectronic transducer in communication with a second end of the electrical signaling medium, and an optical coupling guide for aligning an optical signaling medium with the optoelectronic transducer. An electrical signal from the electronic chip is communicated to the optoelectronic transducer via the substrate and the electrical signaling medium.

In another embodiment, a method of communicating a signal from an electronic computer or signal processing chip to another component in a computer system or data communication system is disclosed. An electrical signal is initiated at the electronic computer or signal processing chip and communicated to a substrate. The electrical signal is communicated from the substrate directly to a flexible electrical circuit via an electrical contact, and then to an optoelectronic transducer where it is converted to an optical signal. The optical signal is communicated to an optical signaling medium for communication to another component in the computer system.

In a further embodiment, an optoelectronic assembly for a computer system or data communication system includes an electronic processing or signal processing chip, a substrate in communication with the electronic chip, a flexible electrical circuit having a first end in direct communication with the substrate via an electrical contact, an optoelectronic transducer in communication with a second end of the flexible electrical circuit, an optical coupling guide at the second end of the flexible electrical circuit for aligning an optical signaling medium with the optoelectronic transducer, and a common heat spreader having surfaces in thermal contact, thereby providing unimpeded heat flow with the electronic chip and the optoelectronic transducer. An electrical signal from the electronic chip is communicated to the optoelectronic transducer via the substrate and the flexible electrical circuit.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides an optoelectronic assembly for a computer system, data communication system, or other electronic system, having a data communication path between an electronic computer, signal processing chip or other electronic chip, and an optoelectronic transducer that bypasses a printed circuit board, thereby providing high speed communication from the electronic chip to other components in the computer system, switching system or other electronic system. Another embodiment provides a high density optical signal path by using multiple optoelectronic transducers, alternatively referred to as a high density optical transceiver (HDOT).

While embodiments described herein depict the interconnection of a processor complex within a Multi-Chip Module (MCM) to other processor complexes having an exemplary optoelectronic signal path, it will be appreciated that the disclosed invention is also applicable to the interconnection of other electronic devices housed in MCMs or SCMs (Single Chip Module), or other types of first level packaging. For example, embodiments of the invention may be employed for interconnecting the core switches within a large-scale Internet switch, or router, with the network processors in the router's line cards. Similarly, other electronic systems requiring dense electrical interconnection of electronic chips mounted on MCMs or SCMs or other types of first level packaging at a high aggregate bandwidth over distances of 0.02 meters (m) or greater may benefit from embodiments of the invention.

Figure 1:
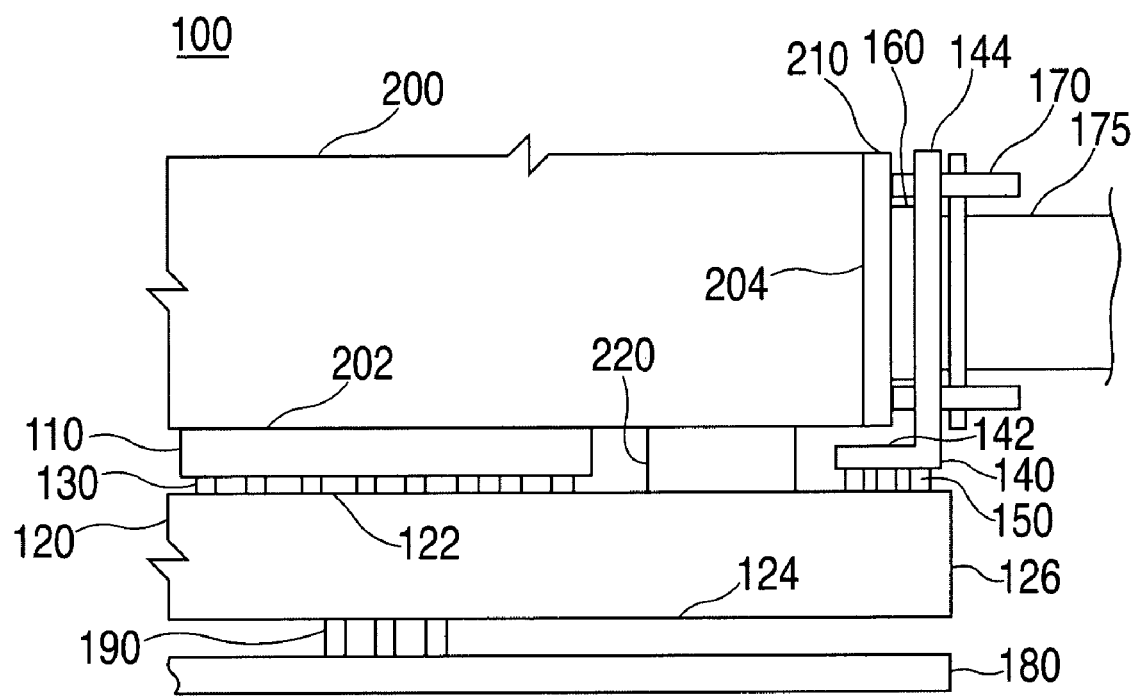
FIG. 1 depicts a partial cross section view of an exemplary optoelectronic assembly in accordance with an embodiment of the invention.
Figure 2:
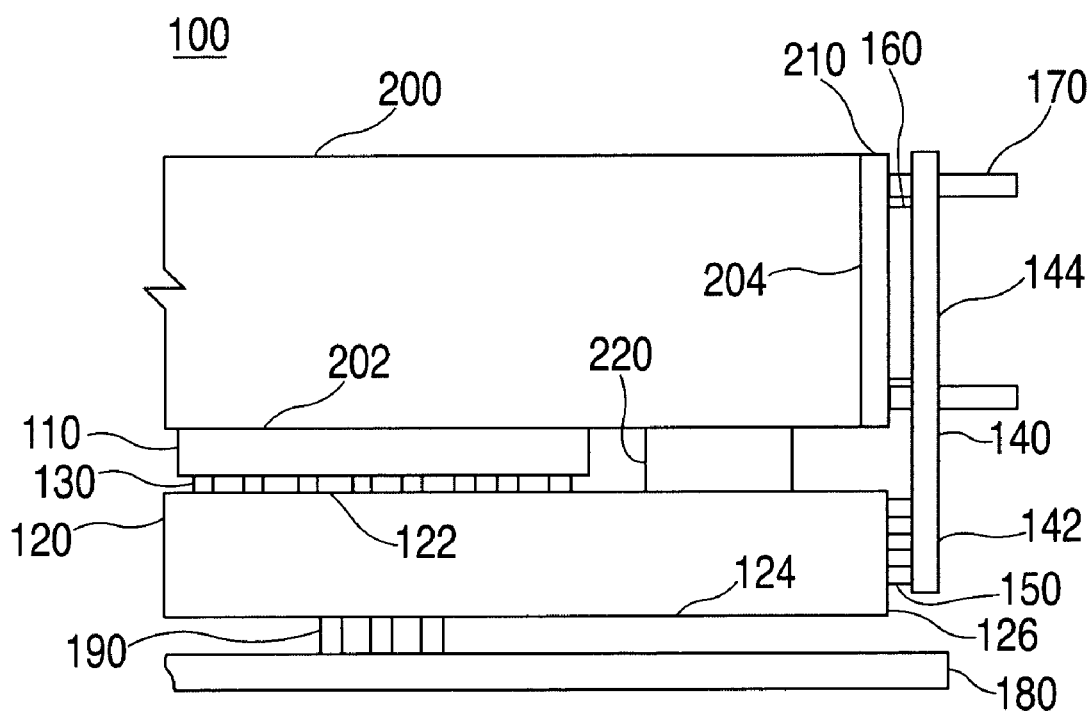
FIG. 2 depicts an alternative arrangement to that depicted in FIG. 1.

Referring now to FIG. 1, a partial cross section view of an optoelectronic assembly 100 for a computer system is depicted having an electronic chip or chips 110 (alternatively referred to as a chip set), a substrate (alternatively referred to as a first level package) 120 having a first major surface 122 in communication with electronic chip 110 via a suitable electrical signal connection 130 (such as C4 micro solder ball interconnect technology for example), an electrical signal medium 140, such as a flexible (flex) circuit, or other means of forming electrical interconnect lines, having a first end 142 in signal communication with substrate 120 via a suitable electrical connection 150 (such as C4 solder balls, or micro-ball-grid-array (uBGA) connections, for example), an optoelectronic transducer (O/E) 160 in communication with a second end 144 of electrical signal medium 140, and optical coupling guides 170 (such as alignment pins for an MT ferrule, or other pluggable optical connector, for example) for aligning optoelectronic transducer 160 with an optical signal medium 175, such as a fiber optic cable or bundle, for example. Also depicted in FIG. 1 is a printed circuit board (alternatively referred to as a second level package) 180 in electrical communication with a second major surface 124 of substrate 120 via a suitable electrical connection 190 (such as column-grid-array connections, land grid array (LGA), or a pin grid array for example, for providing power and communicating signals to and from substrate 120 from and to other components of the computer system. However, in accordance with an embodiment of the invention, electrical signals to and from electronic chip 110 may also be communicated from and to optoelectronic transducer 160 by the combination of substrate 120 and electrical signaling medium 140, thereby bypassing printed circuit board 180. Note that in an embodiment, the electrical signal medium 140 is dedicated to solely providing electrical signaling between substrate 120 and optoelectronic transducer 160 and does not provide electrical interconnection between any additional devices, whereas the substrate 120 may provide electrical signal connections between multiple chips, and the printed circuit board 180 may provide electrical signal between substrate 120 and multiple other devices. Disposed between first and second major surfaces 122, 124 of substrate 120 is an edge surface 126, which will be discussed below in reference to FIG. 2. As used herein, a major surface of substrate 120, such as first and second major surfaces 122, 124, is intended to refer to a surface of substrate 120 that is not an edge surface 126, and is not intended to be limiting in any other way. While reference is made herein to data communication from electronic chip 110 to optoelectronic transducer 160, it will be appreciated that the signal flow is bi-directional, where optoelectronic transducer 160 converts the outbound electrical data signals generated from electronic chip 110 into optical signals (e/o conversion), and inbound optical data signals into electrical signals (o/e conversion).

Further depicted in FIG. 1 is a thermal hat (alternatively referred to as a thermal spreader or heat spreader) 200 having first and second surfaces 202, 204, where first surface 202 is in thermal contact, with electronic chip 110 to effect cooling thereof, and second surface 204 is in thermal contact with optoelectronic transducer 160 to effect cooling thereof. As used herein, the term thermal contact, or thermal communication, refers to an arrangement that provides good heat flow from one surface to another with a minimum change in temperature from one surface to another and does not necessarily denote the absence of an intermediate layer, such as a thermally conductive adhesive or a filler for example. The thermal contact between optoelectronic transducer 160 and second surface 204 of thermal hat 200 may be direct or via a support IC 210 and/or a thermal spreader, discussed below. An air cooled finned heat sink or water cooler modular refrigeration unit (not shown), or other means of removing heat, may be attached to the top surface of the thermal hat 200 to further effect heat transfer. The thermal hat provides the primary thermal path for heat flow from both the electronic chip or chips 110 and the optoelectronic transducer(s) 160 to the heat sink or other means used to cool the system. If an LGA is used, the thermal hat also provides mechanical rigidity for applying the actuation force to the LGA. Optoelectronic assembly 100 may include a seal 220 between substrate 120 and thermal hat 200 that traverses the perimeter of substrate 120 (shown here in a partial cross section view), thereby providing protection to electronic chip or chips 110 from foreign contaminants.

Optoelectronic transducer 160 may include a support IC (integrated circuit) 210 that may be integrally arranged with optoelectronic transducer 160. Support IC 210 is electrically connected between electrical signaling medium 140 and optoelectronic transducer 160 for communicating the electrical signals therebetween. In an embodiment, optoelectronic transducer 160 includes a laser, such as a vertical cavity surface emitting laser (VCSEL), a light emitting diode, a photodiode (PD) array, or other light emitting or photosensitive device array, in communication with support IC 210 for receiving an electrical signal therefrom and for generating an optical signal in response thereto or for receiving a light signal and for generating an electrical signal in response thereto. The output of optoelectronic transducer 160 is a light signal for outbound transmission that is aligned with and communicated to optical signaling medium 175 for subsequent communication, and an electrical signal for inbound transmission upon receipt of a light signal from optical signaling medium 175, as discussed above.

Electronic chip 110 may be a processor chip, a memory chip, a signal processing chip, a switching chip, or any combination thereof or multiple combinations thereof, and substrate 120 may be a multi-chip module (MCM), a dual-chip module (DCM), a single-chip module (SCM), or any other type of first level package substrate, or any combination thereof. Substrate 120 may also be manufactured from a ceramic or an organic material. In an embodiment, electrical signaling medium 140 is a flexible printed circuit board, sometimes referred to as a flex circuit or a flex, having a flexible copper interconnection media that may have many high speed lines within a single or several planes within the flex circuit. In some embodiments, short flexes may have a high speed signal path on the order of 80 Giga-Hertz (GHz) or more.

Figure 3:
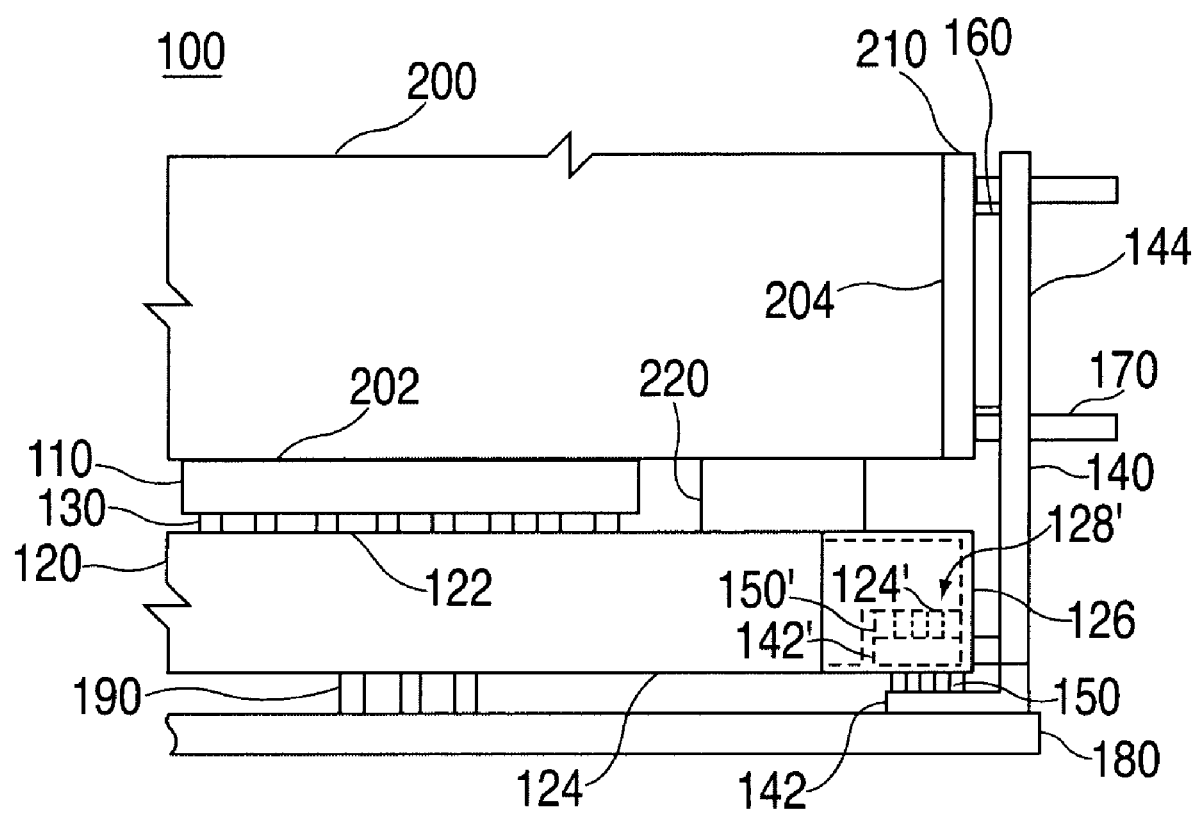
FIG. 3 depicts a further alternative arrangement to that depicted in FIG. 1.

As depicted in FIG. 1, first end 142 of flex 140 may be arranged in electrical communication with first surface 122 of substrate 120. In an alternative embodiment, and referring now to FIG. 2, first end 142 of flex 140 may be arranged in electrical communication with edge surface 126 of substrate 120, thereby avoiding the need to bend flex 140 and avoiding the use of surface area at first and second major surfaces 122, 124 of substrate 120. In a further alternative embodiment, and referring now to FIG. 3, first end 142 of flex 140 may be arranged in electrical communication with second major surface 124 of substrate 120, thereby avoiding use of surface area at first major surface 122 of substrate 120. In an alternative embodiment, shown with dashed-line and prime-mark in FIG. 3, second surface 124' of substrate 120 may have a recessed shelf 128' cut in at the perimeter of substrate 120 where the electrical contacts, such as microBGA or C4's or other electrical joining means 150' and first end 142' are located, thereby reducing the overall height of the assembly of flex 140 to substrate 120. As discussed above, all embodiments depicted in FIGS. 1-3 show an electrical signal path passing from electronic chip or chips 110 to substrate 120, to flex 140, and then to optoelectronic transducer 160, with the signal path bypassing printed circuit board 180. Also, there is a common primary thermal path for the electronic chip(s) 110 and the optoelectronic transducer(s) 160 where they share a thermal hat onto which a heat sink or other heat removing device is attached. In an alternative embodiment, electronic chip set 110 and optoelectronic transducers 160 may all be directly attached to a heat sink instead of to an intermediate thermal hat or other thermally conductive object.

Figure 4:
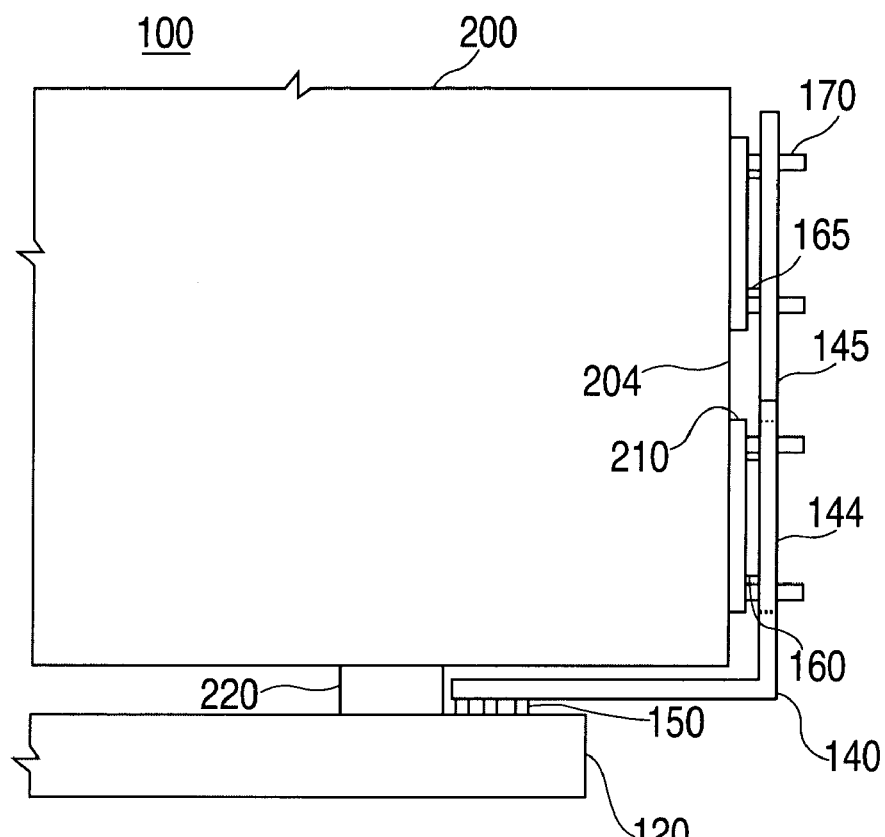
FIG. 4 depicts a similar arrangement to that of FIG. 1 with multiple high density optical transceivers on a common thermal spreader in accordance with an embodiment of the invention.
Figure 5:
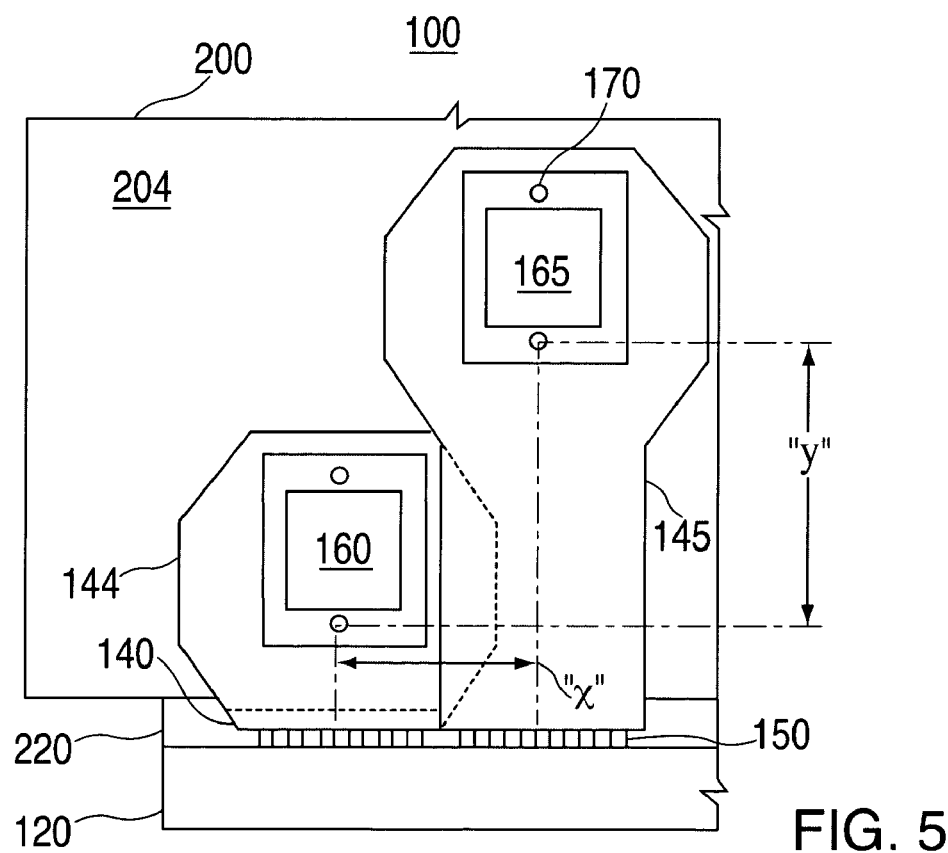
FIG. 5 depicts an orthogonal side view of the view depicted in FIG. 4.

Referring now to FIGS. 4 and 5, where FIG. 4 depicts a partial cross section view similar to that of FIG. 1 and FIG. 5 depicts an orthogonal side view of FIG. 4, optoelectronic assembly 100 is now depicted having first and second optoelectronic transducers (O/Es) 160, 165 in communication with substrate 120 via first and second flexes 140, 145 and C4 or micro BGA solder balls 150. With multiple O/Es, multiple electrical signals and multiple optical signals may be transmitted at the same time in parallel. As depicted, first and second O/Es 160, 165 are offset from one another vertically by dimension "y" and horizontally by dimension "x", thereby improving the packing density of O/Es 160, 165 on second surface 204 of thermal spreader 200. Multiple O/Es 160, 165 may be arranged in an offset or "brick-walling" manner, thereby taking advantage of the high density lines in the flex circuit. FIG. 5 also depicts seal 220 partially traversing the perimeter of substrate 120.

During the operation of optoelectronic assembly 100, where a signal from electronic chip 110 is communicated to another component in the computer system, the electrical signal, initiated at electronic chip 110 and communicated to substrate 120, is directly communicated from substrate 120 to flex 140 via electrical connection 150, thereby bypassing printed circuit board 180. The signal then passes to optoelectronic transducer 160 where it is converted from an electrical signal to an optical signal, after which the optical signal is communicated to an optical signaling medium (such as a fiber optic ribbon cable 175, for example) for communication to another component in the computer system. During this operation, heat generated at electronic chip 110 is transferred across first surface 202 at thermal hat 200 and away from electronic chip 110. Also, heat generated at optoelectronic transducer 160 is transferred across second surface 204 of thermal hat 200 and away from optoelectronic transducer 160.

In an alternative embodiment where two or more optoelectronic transducers 160, 165 are employed, not only are the electrical signals communicated and converted to optical signals, but also each of the electrical signals in their respective flex path are off-set with respect to each other in a vertical direction, a horizontal direction, or in both directions, thereby increasing the signal density available at second surface 204 of thermal hat 200. In the multiple O/E arrangement, second surface 204 of thermal hat 200 provides a similar thermal spreader function to all O/Es as discussed above for a single O/E arrangement. As herein disclosed and discussed, it will now be appreciated that embodiments of the invention are not limited to just one or two O/Es, but may be applied to many O/Es.

As discussed above, the high density optoelectronic transducers, alternatively referred to as an HDOT (High Density Optical Transceiver, herein represented by numeral 160), which may be a parallel transmitter, a parallel receiver, or a combination of parallel transmitter and receiver. The companion HDOT at the other end of the link on another first level package substrate (MCM for example) performs the o/e and e/o conversions for the other processor complex (represented by electronic chip 110). In an embodiment, electronic chip 110 is an electronic chip set 110 that includes signal multiplexing and coding functions, as well as functions for driving an e/o device directly and functions for receiving a signal directly from an o/e device.

Some embodiments of the invention include some of the following advantages: the flex pad contact area takes up less surface area on the substrate (MCM for example) than does an optical transducer; the close proximity of the optoelectronic components to the electronic chip (processor for example) enables high speed data transmission, with rates at 20–50 GHz or greater; use of high speed transmission medium (copper lines on ceramic or flex, for example) and short transmission distances (50–75 millimeters for example) between processor and optoelectronic transducer; reduced size of the optoelectronic transceiver by having a common thermal path with the electronic chips to the thermal spreader and/or heat sink; reduced thermal resistance for the HDOT by using the available system cooling, thereby maintaining low temperatures for improved reliability. Some embodiments also provide a strain relief path for the fiber optic cable via a solid mounting surface, and preserve space on the printed circuit board and MCM. Mounting of the optical interface above the components and printed circuit board allows the optical cables to easily route to another MCM or to the edge of the printed circuit board for connection to another printed circuit board or MCM. Some embodiments enable common attachment processes, and standard MCM rework processes. The direct attachment of the optics to the chip carrier (MCM as an example of a first level package) enables a high bandwidth and low cost approach to optical interconnection of processor groups, and a "brick-walling" arrangement of HDOTs provides for the high density packing and optimal space utilization. Also, edge mounting the flex may reduce MCM substrate size by minimizing use of top or bottom surface area.

Other advantages from using embodiments of the invention may be realized since the use of HDOT and fiber optics technology enables the high speed communication required between future processor complexes and allows improved packaging flexibility with its extended length capability. The bandwidth distance product capability of fiber optics allows future scaling of the bandwidth with the future processor speeds. The use of the high speed properties of HDOT and fiber optic technology, at 20–50 Giga-bits per second per line or greater, with direct first level package or MCM attachment enables the multiplexing of many parallel electrical signals into a single optical signal. This feature enables significant cost and complexity reduction by decreasing the number of signal lines between processor complexes, minimizes the need to de-skew the parallel signals, and provides inherent Electromagnetic Compatibility (EMC) because the signal is optical and is not susceptible to nor does it radiate electromagnetic energy. This approach simplifies the system packaging by reducing the number of complicated electrical connectors and simplifies the system printed circuit boards and back plane boards.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An optoelectronic assembly for a computer system, comprising:
   an electronic chip set;
   a printed circuit board;
   a substrate disposed between the electronic chip set and the printed circuit board, the substrate comprising a first major surface opposing a second major surface, wherein the first major surface is in communication with the electronic chip set, and wherein the second major surface is in electrical communication with the printed circuit board;
   an electrical signaling medium having a first end in signal communication with the substrate;
   an optoelectronic transducer in signal communication with a second end of the electrical signaling medium; and
   an optical coupling guide for aligning an optical signaling medium with the optoelectronic transducer;
   wherein an electrical signal from the electronic chip set is communicated to the optoelectronic transducer via the substrate and the electrical signaling medium, and
   wherein the electronic chip set and the optoelectronic transducer share a common thermal path for cooling;
   a heat spreader having a first and second surface, the first surface in thermal contact with the electronic chip set and adapted to provide unimpeded heat flow, and the second surface in thermal contact with the optoelectronic transducer, the first surface being orthogonal to the second surface, the optoelectronic transducer being mounted on the second surface.

2. The assembly of claim 1, wherein:
   the electronic chip set comprises a processor chip, a memory chip a signal processing chip, a switching chip, or any combination thereof; and
   the substrate comprises a multi-chip module, a dual-chip module, a single-chip module, or any combination thereof.

3. The assembly of claim 1, wherein the substrate is an organic or a ceramic substrate containing electrical interconnects.

4. The assembly of claim 1, wherein:
   the electrical signaling medium is a flexible printed circuit board; and
   the substrate comprises an edge surface disposed between the first and second major surfaces.

5. The assembly of claim 1, wherein the optoelectronic transducer comprises:
   an integrated circuit in communication with the second end of the electrical signaling medium; and
   a laser, a vertical cavity surface emitting laser, a light emitting diode, a photodiode, or other light emitting or photosensitive device array, in electrical communication with the integrated circuit.

6. The assembly of claim 1, wherein the optical coupling guide is a set of alignment pins.

7. The assembly of claim 4, wherein the first end of the flexible printed circuit board is in communication with the first major surface of the substrate.

8. The assembly of claim 4, wherein the first end of the flexible printed circuit board is in communication with the second major surface of the substrate.

9. The assembly of claim 4, wherein the first end of the flexible printed circuit board is in communication with the edge surface of the substrate.

10. An optoelectronic assembly for a computer system, comprising:
    an electronic chip set adapted for at least one of data processing, data switching, and data storage;
    a substrate comprising a first major surface in electrical communication with the electronic chip set, a second major surface opposing the first surface, and an edge surface disposed between the first and second surfaces;
    an electrical signaling medium having a first end in signal communication with the substrate;
    an optoelectronic transducer in signal communication with a second end of the electrical signaling medium; and
    an optical coupling guide for aligning an optical signaling medium with the optoelectronic transducer;
    a printed circuit board in communication with the second major surface of the substrate;
    wherein an electrical signal from the electronic chip set is communicated to the optoelectronic transducer via the substrate and the electrical signaling medium, and
    wherein the electronic chip set and the optoelectronic transducer share a common thermal path for cooling,
    wherein the electrical signaling medium is a flexible printed circuit board;
    wherein the flexible printed circuit board is absent electrical signal interconnections except for electrical signal interconnections between the substrate and the optoelectronic transducer.

11. The assembly of claim 8, wherein:
    the second major surface of the substrate includes a shelf or recess; and
    the first end of the flexible printed circuit board is in communication with the substrate at the shelf or recess.

12. The assembly of claim 1, further comprising a second optoelectronic transducer in thermal contact with the second surface of the thermal spreader, the first and second optoelectronic transducers being offset from one another in at least one of a vertical direction and a horizontal direction.

13. The assembly of claim 2 wherein the electronic chip set comprises signal multiplexing and coding functions for driving an e/o device directly, and functions for receiving a signal directly from an o/e device.

14. The assembly of claim 1, further comprising:

at least a second optoelectronic transducer in thermal contact with the second surface of the thermal spreader, the first and at least a second optoelectronic transducers being offset from each other in both a vertical direction and a horizontal direction, thereby improving packing density of the optoelectronic transducers on the thermal spreader.

15. The assembly of claim 1 wherein the optical coupling guide is mounted on the second surface.

* * * * *